United States Patent [19]

Strakeljahn

[11] 3,893,372

[45] July 8, 1975

[54] FINISHING TOOL

[76] Inventor: Heinz Strakeljahn, 13228 S. E. 231 St., Kent, Wash. 98031

[22] Filed: Aug. 6, 1973

[21] Appl. No.: 385,955

[52] U.S. Cl. ........... 90/12 D; 144/134 D; 144/136 C
[51] Int. Cl. ............................................. B23c 1/20
[58] Field of Search ............ 90/12 D, DIG. 3, 12 R; 144/134 D, 136 C; 51/170 TL, 54; 30/276, 289, 290, 292, 293

[56] References Cited
UNITED STATES PATENTS

| | | | |
|---|---|---|---|
| 2,350,098 | 5/1944 | Decker | 51/170 TL |
| 2,856,975 | 10/1958 | Addis | 144/134 D |
| 2,952,281 | 9/1960 | Weber | 144/134 D X |
| 3,207,193 | 9/1965 | Godfrey et al. | 144/134 D X |
| 3,212,541 | 10/1965 | Burrows et al. | 144/134 D |

FOREIGN PATENTS OR APPLICATIONS

| | | | |
|---|---|---|---|
| 998,320 | 7/1965 | United Kingdom | 144/134 D |

Primary Examiner—Andrew R. Juhasz
Assistant Examiner—Z. R. Bilinsky
Attorney, Agent, or Firm—Graybeal, Barnard, Uhlir & Hughes

[57] ABSTRACT

A hand operated power tool for finish trimming an edge of a structure such as a counter top. The tool has the capability of trimming the edge at various angles of bevel or as a square corner, both as a right and left hand trimmer, and operating in difficult access areas, such as a "blind corner". The tool comprises a housing having a forwardly extending right angle transmission assembly terminating in a downwardly extending forwardly positioned shaft on which is mounted a cutter head. To position the tool properly for movement along the counter edge portion, the tool has an adjustable base comprising two plate-like feet connected to the tool housing by forward and rear leg assemblies. The leg assemblies are angularly adjustable so as to permit adjustment of the position of the tool with respect to both the angle and depth of cut. A stop member is provided to facilitate operation of the tool in a blind corner.

8 Claims, 6 Drawing Figures

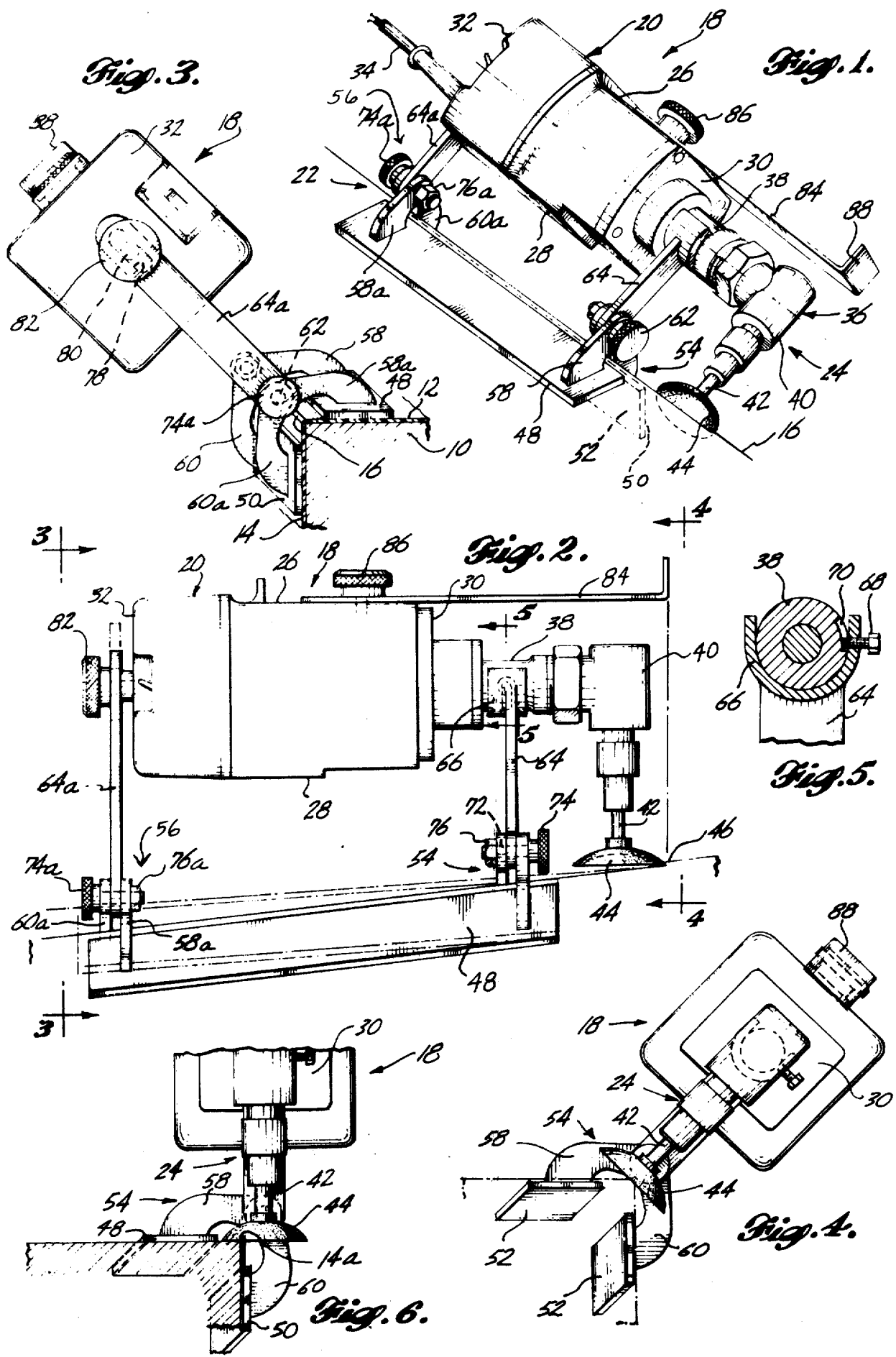

FINISHING TOOL

BACKGROUND OF THE INVENTION

1. Field of the Invention

The present invention relates generally to a hand operated power tool adapted for finishing an edge portion of a structure such as that formed by two surface sheets (e.g. laminated platic sheets) on a counter top or the like.

2. Description of the Prior Art

Structures such as counter tops, desk tops, etc. are commonly finished by applying a surface sheet (commonly a laminated plastic such as Formica, Textolite, etc.) to both the top and side surfaces of the structure. At the edge line at which the top and side surface sheets meet, it is usually necessary to perform a finish trimming or routing operation. In some instances it is desirable to bevel the edge, and in other circumstances it is desirable to provide a square edge, with the overlapping sheet being trimmed evenly with the exposed surface of the other sheet.

The usual manner of accomplishing this edge trimming operation is partly by a conventional hand operated portable router and partly by a hand finishing operation with a file. The reason for this is that the typical hand operated power router presently used is not able to operate in areas of limited access, such as a blind corner where the trimming tool must be moved closely adjacent an adjoining wall surface. Thus hand finishing is required in this area. Further, with the prior art tools, it is often difficult to get accurate trimming with respect to angle and depth of cut.

A variety of hand operated tools adapted for various routing, trimming, shaping, or cutting are disclosed in the prior art. The devices shown in the following patents are representative of these: Graham, U.S. Pat. No. 3,494,395; Linstead, U.S. Pat. No. 2,635,655; Moeller, U.S. Pat. No. 2,705,513; Ritt, U.S. Pat. No. 3,537,492; and Stock, U.S. Pat. No. 3,494,394.

SUMMARY OF THE INVENTION

The present invention comprises a hand operable power tool adapted for finish trimming an edge portion of a structure, such as that formed by the juncture of two surface sheets (e.g. laminated plastic sheets on a substrate such as a counter top). The tool comprises a main housing having a downwardly extending mounting base and a forwardly extending working assembly. The mounting base has a pair of angularly adjustable plate-like guide feet to engage the two surface sheets and thus properly position the tool.

In the preferred form, there are front and rear leg assemblies which are angularly adjustable about a longitudinally aligned axis proximate the juncture of the contact planes of the two guide feet, permitting various angles of edge cuts to be made. Also the angle of the two feet can be adjusted with respect to one another to engage variously angled surfaces. The working assembly provides a forwardly positioned downwardly extending working shaft the lower end of which is adapted to receive a cutting tool, thus permitting the tool to be operated in limited access areas, such as a blind corner.

Other features of the invention will become apparent from the following detailed description.

BRIEF DESCRIPTION OF THE DRAWINGS

FIG. 1 is an isometric view of the apparatus of the present invention shown finishing an edge portion of a counter top;

FIG. 2 is a side elevational view of the apparatus shown in FIG. 1, with a modified angle of adjustment;

FIG. 3. is a rear view taken from the plane indicated at 3—3 in FIG. 2;

FIG. 4 is a view taken from the plane at 4—4 of FIG. 2;

FIG. 5 is a sectional view taken along line 5—5 of FIG. 2; and

FIG. 6 is a front view of the apparatus in an upright position removing an upstanding overhang of a surface material of a counter.

DESCRIPTION OF THE PREFERRED EMBODIMENT

In the accompanying drawing, there is illustrated a counter top comprising a counter top base 10, having upper and side surfaces covered by, respectively, top and side surface sheets, 12 and 14, respectively. Such finish sheets 12 and 14 are generally made of laminated plastic, such as Formica, Textolite or the like. When surface sheets are applied to a base 10, the edge line 16 at which the two sheets 12 and 14 meet must be trimmed to form a finished edge. The apparatus of the present invention is particularly adapted to provide such a finished edge, either a bevel edge or a square edge, and is also adapted to finish such an edge leading into a blind corner, which heretofore has not been possible to be accomplished mechanically, but required a hand finishing operation.

The apparatus of the present invention is a hand operated power tool, generally designated 18, which comprises a main housing 20, a mounting base 22 and a forward working assembly 24. For purposes of description, this housing 20 will be considered as having a top 26 positioned away from the counter edge 16 in its normal mode of operation, a bottom 28 positioned nearer the counter edge 16, a forward end 30 at which the working assembly 24 is located, and a rear end 32 at which is attached the electric cord 34 by which the tool 18 is powered (this cord 34 being shown only in FIG. 1 for convenience of illustration).

The housing 20 is of conventional design and contains a reversible electric motor which powers the working assembly 24. The working assembly 24 comprises a right angle transmission housing 36 comprising a longitudinal tubular section 38 extending forwardly from the forward end 30 of the housing 20, and a depending tubular section 40 reaching downwardly from the forward end of the section 38. This transmission housing is fixedly secured to the main housing, so that the two housings 20 and 36 can be considered collectively as the tool housing 20–36. The transmission housing 36 contains a conventional right angle drive transmission, which transmits power from the motor in the housing 20 to a working shaft 42 reaching downwardly from the depending transmission housing section 40.

Mounted to the lower end of the working shaft 42 is a trimming head or disc 44, arranged to engage the counter edge 16 to apply a proper finish thereto. This trimming head has a circular disc-like configuration and provides a circumferential cutting edge 46 arranged concentrically with respect to the axis of the working shaft 42. Desirably, the bottom face of the head 44 is moderately concave.

The mounting base 22 comprises right and left guide feet 48 and 50, respectively. Each guide foot 48 and 50 defines a respective contact plane at which it is able to engage one or the other of the counter surfaces 12 and 14. In the preferred form, each of the feet 48 and 50 comprises a metal plate having a planar contact surface 52 adapted to fit flush against a respective counter surface 12 or 14 and slide along such surface.

The two feet 48 and 50 are connected to the housing 20 by forward and rear leg assemblies 54 and 56, respectively. The forward leg assembly 54 comprises right and left legs 58 and 60, rigidly connected by their lower ends to the forward top side of their respective foot plates 48 and 50. The two legs 58 and 60 each extend inwardly parallel to and a moderate distance above the contact surface 52 of its related foot 48 and 50, with the two legs 58 and 60 meeting one another at a juncture point 62 positioned just a short distance from the line at which the planes of the two contact surfaces 52 of the feet 48 and 50 meet. It is to be understood that when the tool 18 is applied to the counter surface 12 and 14, the contact planes of the feet 48 and 50 are coincident with the planes of the surface sheets 12 and 14, so that the juncture line of the planes 52 is coincident with the counter edge 16. Thus, in the normal mode of application of the tool 18, the juncture point 62 of the legs 58 and 60 is spaced a short distance away from the counter edge 16.

Extending outwardly from the juncture point 62 of the legs 58 and 60 is a middle leg 64, the upper end of which is connected to the tool housing 20-36, and more specifically to the longitudinal section 38 of the transmission housing 36. This is an angularly adjustable connection that is shown in detail in FIG. 5, and it comprises a semi-circular generally U-shaped member 66 fixedly attached to the upper end of the middle leg 64 and snugly engaging the housing section 38. A set screw 68 extends through the member 66 to protrude into an arcuate slot 70 in the housing section 38. Thus, the leg 64 can be fixedly attached to the unitary housing 20-36, while allowing for some angular adjustment with respect to the longitudinal axis of the tool 18.

At the juncture point 62 of the forward leg assembly 54, the three legs 58, 60 and 64 join to one another in overlapping relationship, each having related aligned holes, these three holes being collectively designated 72. A clamping screw 74 reaches through the three holes 72 to engage a clamping nut 76. Thus the three legs 58, 60 and 64 can be moved to various angular positions with respect to one another, and clamped in a particular position by the screw and nut 74–76.

The rear leg assembly 56 is substantially the same as the forward leg assembly 54, and therefore will be described only briefly herein, with like components being given like numerical designations, with an "a" suffix distinguishing those of the rear leg assembly 56. Thus there are right and left legs 58a and 60a, respectively, which join to a middle upstanding leg 64a, with the three legs being adjustably fixed to one another by a rear set screw and nut 74a–76a.

The rear leg assembly 56 differs from the forward leg assembly 64 in the manner in which the middle upstanding leg 64a is joined to the housing 20. The upper portion of the middle leg 64a is formed with a longitudinal slot 78 which receives a clamping screw 80 extending rearwardly from the housing 20. A knurled clamp nut 82 engages the screw 80 to firmly secure the leg 64a to the housing 20, while permitting inward and outward adjustment of the rear portion of the housing 20 with respect to the rear leg assembly 56. Thus the connection of the rear upper leg 64a to the housing 20 is both vertically adjustable and angularly adjustable about the longitudinal axis of the tool 18.

There is a stop member 84 mounted to the top side of the housing 20 and extending forwardly therefrom. The member 84 is secured to the housing 20 by means of a clamp screw 86, so that forward and rearward adjustment of the stop member 80 is possible. While not shown specifically herein, it is understood that the adjustable mounting of the stop member 84 and clamp nut 86 is similar to the adjustable mounting of the rear leg 64a and the clamp nut 82. The forward end of the stop member 84 has an upturned contact member 88 adapted to engage a wall surface as the tool 18 is operated in a blind corner, as will be disclosed more particularly below.

To describe the operation of the present invention, let it be assumed that it is desired to finish trim a rough edge 16 of a counter top. First, the two clamp screws 74 and 74a are loosened moderately to permit angular movement of their respective leg members 58, 60 and 64, and 58a, 60a and 64a. The two plate feet 48 and 50 are placed in contact with the counter, one against the top sheet 12 and the other against the side sheet 14. In the event that the side surface is not perpendicular to the top surface, the angle of the two feet 48 and 50 can be adjusted to match such surfaces. Next the housing 20 is moved angularly with respect to the forward and rear pivot points 62 and 62a to obtain the proper bevel angle between the plane of the cutting head 44 and the edge 16. Then the two clamp screws 74 and 74a are tightened to fix the angular relationship of the legs of the forward and rear leg assemblies 54 and 56.

The next step is to bring the peripheral cutting edge 46 of the head 44 into precise engagement with the counter edge 16. This is accomplished by keeping the rear clamp nut 82 moderately loose and moving the rear of the housing 20 upwardly and downwardly to cause opposite downward or upward movement of the head 44, and then clamping the nut 82 into position when the proper position of the head 44 is achieved. There is sufficient flexibility or resilience in the leg assemblies 54 and 56 to permit such adjustment.

With the tool 18 so oriented, the tool 18 can be brought into engagement with the edge area of the counter with the feet 48 and 50 in contact with the counter surfaces 12 and 14, and be moved therealong with the trimming head 44 cutting a proper finished bevel edge surface on the counter edge 16. When the tool 18 is moved toward a blind corner (i.e. a location where the counter edge 16 is joining a wall) the tool 18 is turned off, and the cutting edge 46 is moved up to the wall. Then the stop member 84 is moved so that its contact face 88 comes into engagement with the wall, and the clamp nut 86 is tightened to fix the stop member 84 in place. Then the cutting head 44 can trim the edge 16 directly into the blind corner (i.e. up to the wall) without actually contacting the wall so as to avoid any scarring of the wall.

Another mode of operation of the tool 18 is illustrated in FIG. 6. In FIG. 6, the sheets 12 and 14 are so arranged that the side surface sheet 14 has an upstanding overhang 14a. In the operation illustrated in FIG. 6, the tool 18 is arranged to cut a square corner (i.e. trim the top edge of the side sheet 14 in a plane parallel to the exposed surface of the top sheet 12. In this circumstance, substantially the same mode of operation is followed as described above. That is to say, the two plate feet 48 and 50 are brought into contact with the surface sheets 14 and 16, and the tool swung to an upright position with the working shaft 42 extending vertically. The adjustment of the cutting head 44 is accomplished by manipulating the rear of the housing upwardly or downwardly, and clamping it in place with the clamp nut 82.

Although the cutting head 44 is moderately off center with respect to the counter edge 16, this does not interfere with the proper trimming operation of the head 44. However, if it is desired to center the cutting head 44 with respect to the counter edge 16, it is merely necessary to tilt the housing 20 further inwardly over the counter top surface 12, and then use the angular adjustment of the housing 20 with respect to the middle legs 64 and 64a to swing the cutting head 44 directly over the counter edge 16. Since the drive motor in the housing 20 is reversible, it is possible to operate the tool into both right and left hand corners and have the cutter head 44 rotating in the proper direction relative to the location of the counter 10 and sheets 12 and 14.

Thus it can readily be appreciated that the tool 18 of the present invention has the capability of finish trimming a counter edge to any desired angle, including various angles of bevel as well as a straight cut, and further has the capability of operating in a blind corner without damaging structure adjacent to the counter.

What is claimed is:

1. A hand operable power tool especially adapted for finish trimming an edge portion of a structure, such as that formed by the juncture of two surface sheets on a substrate, which sheets lie in different planes and meet at a juncture line, as for example, two laminated plastic sheets joined to top and side surfaces of a counter top, said tool comprising:
   a. a main housing having forward, rear, top and bottom portions, said housing having a longitudinal axis,
   b. a mounting base attached to said housing and comprising a first guide foot providing a first contact surface adapted to engage one of said surface sheets, and a second guide foot providing a second contact surface adapted to engage the other of the surface sheets, thereby orienting said housing with respect to said edge portion, while permitting travel along said edge portion,
   c. said mounting base further comprising longitudinally oriented pivot means permitting angular adjustment of said housing about said guide feet along a generally longitudinal axis, whereby the angle of engagement of said tool with said edge portion can be varied, and said pivot means is at a location proximate a juncture line of planes defined by the contact surfaces of said first and second guide feet, whereby said working assembly remains in proper position for engagement with said edge portion when the angular position of said tool is adjusted about said axis, and
   d. a working assembly comprising a right angle power transmission housing comprising a first longitudinal housing portion and a second transmission housing portion depending from the forward end of the longitudinal transmission housing portion and carrying a working shaft adapted to hold a trimming head at the lower end thereof, the lower end of the shaft being positioned forwardly of said main housing and said mounting base, so that a trimming head on said shaft can operate forwardly of said main housing and said mounting base, whereby said tool can be oriented by said guide feet into working engagement with said edge portion and moved forwardly into a limited access area, such as a blind corner, with said working assembly being able to perform a finishing operation on the edge portion in said limited access area.

2. The tool as recited in claim 1, wherein there is a forwardly extending stop member positioned forwardly of said working assembly, above the lower end of said working shaft whereby forward limit of travel of said tool can be provided in a limited access area by said stop member engaging an upright wall, while allowing a trimming head on the lower end of the working shaft to operate up to said wall.

3. The assembly as recited in claim 1, wherein said guide feet are adjustably mounted with respect to one another, whereby the angle of said two contact surfaces can be varied so as to come in proper engagement with surface sheets of varying angles.

4. A hand operable power tool especially adapted for finish trimming an edge portion of a structure, such as that formed by the juncture of two surface sheets on a substrate, which sheets lie in different planes and meet at a juncture line, as for example, two laminated plastic sheets joined to top and side surfaces of a counter top, said tool comprising:
   a. a main housing having forward, rear, top and bottom portions, said housing having a longitudinal axis,
   b. a mounting base attached to said housing and comprising a first guide foot providing a first contact surface adapted to engage one of said surface sheets, and a second guide foot providing a second contact surface adapted to engage the other of the surface sheets, thereby orienting said housing with respect to said edge portion, while permitting travel along said edge portion, said guide foot further comprising longitudinally oriented pivot means permitting angular adjustment of said housing about said guide feet along a generally longitudinal axis, whereby the angle of engagement of said tool with said edge portion can be varied, and forward and rear mounting assemblies, one of said mounting assemblies being vertically adjustable, thereby permitting adjustment of the vertical orientation of said working assembly, and
   c. a working assembly mounted to the forward portion of said housing and comprising a forwardly disposed downwardly extending working shaft adapted to hold a trimming head at the lower end thereof, whereby said tool can be oriented by said guide feet into working engagement with said edge portion and moved forwardly into a limited access area, such as a blind corner, with said working assembly being able to perform a finishing operation on the edge portion in said limited access area.

5. A hand operable power tool especially adapted for finish trimming an edge portion of a structure, such as that formed by the juncture of two surface sheets on a substrate, which sheets lie in different planes and meet at a juncture line, as for example, two laminated plastic sheets joined to top and side surfaces of a counter top, said tool comprising:
 a. a main housing having forward, rear, top and bottom portions, said housing having a longitudinal axis,
 b. a mounting base attached to said housing and comprising a first guide foot providing a first contact surface adapted to engage one of said surface sheets, and a second guide foot providing a second contact surface adapted to engage the other of the surface sheets, thereby orienting said housing with respect to said edge portion, while permitting travel along said edge portion, said guide foot further comprising longitudinally oriented pivot means permitting angular adjustment of said housing about said guide feet along a generally longitudinal axis, whereby the angle of engagement of said tool with said edge portion can be varied, and forward and rear mounting assemblies, each of said mounting assemblies comprising two leg means attached one to each guide plate, and a third leg means attaching to said first two leg means and to said housing, the three leg means of each mounting assembly being angularly adjustable with respect to each other, and
 c. a working assembly mounted to the forward portion of said housing and comprising a forwardly disposed downwardly extending working shaft adapted to hold a trimming head at the lower end thereof, whereby said tool can be oriented by said guide feet into working engagement with said edge portion and moved forwardly into a limited access area, such as a blind corner, with said working assembly being able to perform a finishing operation on the edge portion in said limited access area.

6. The tool as recited in claim 5, wherein one of said mounting assemblies is also vertically adjustable with respect to said housing, whereby vertical orientation of said working assembly is permitted.

7. The tool as recited in claim 5, wherein said housing is further angularly adjustable about a longitudinally aligned axis spaced upwardly from the longitudinally oriented pivot means, whereby alignment of said working assembly can be further adjusted with respect to said edge portion.

8. A hand operable power tool especially adapted for finish trimming an edge portion of a structure, such as that formed by the juncture of two surface sheets on a substrate, which sheets lie in different planes and meet at a juncture line, as for example, two laminated plastic sheets joined to top and side surfaces of a counter top, said tool comprising:
 a. a main housing having forward, rear, top and bottom portions, said housing having a longitudinal axis,
 b. a mounting base attached to said housing and comprising a first guide foot providing a first contact surface adapted to engage one of said surface sheets, and a second guide foot providing a second contact surface adapted to engage the other of the surface sheets, thereby orienting said housing with respect to said edge portion, while permitting travel along said edge portion, and
 c. a working assembly mounted to the forward portion of said housing and comprising a forwardly disposed downwardly extending working shaft adapted to hold a trimming head at the lower end thereof, whereby said tool can be oriented by said guide feet into working engagement with said edge portion and moved forwardly into a limited access area, such as a blind corner, with said working assembly being able to perform a finishing operation on the edge portion in said limited access area, said tool being further characterized in that:
 d. said working assembly comprises a right angle power transmission housing comprising a first longitudinal transmission housing portion and a second transmission housing portion depending from the forward end of the longitudinal transmission housing portion and carrying said working shaft,
 e. said mounting base comprising forward and rear mounting assemblies, each of said mounting assemblies comprising:
  1. two leg means attached one to each guide plate,
  2. a third leg means attaching to said first two leg means at a predetermined pivot location and also attached to said housing, with the pivot location of the first and second leg assemblies defining a longitudinal axis about which said tool can be angularly adjusted, said axis being at a location proximate a juncture line of planes defined by the contact surfaces of said first and second guide feet, and
  3. one of said mounting assemblies being vertically adjustable with respect to said main housing, whereby said working assembly can be adjusted vertically.

* * * * *